Dec. 2, 1958  S. HERSCOVICI ET AL  2,863,144
DEVICES FOR VARYING THE DIRECTION OF AN
ELECTROMAGNETIC WAVE RADIATION
Filed July 1, 1957  2 Sheets-Sheet 2

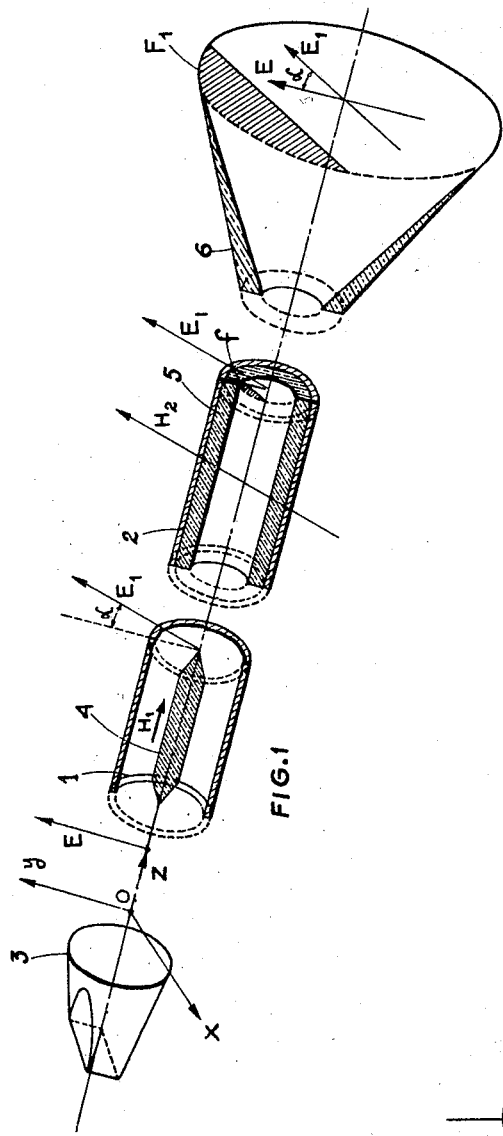
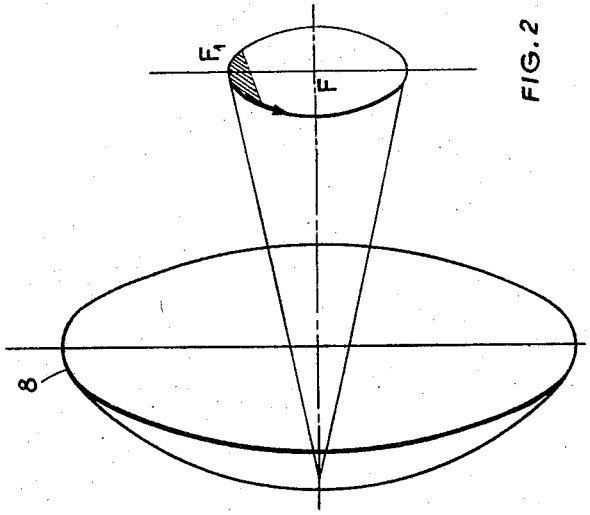

United States Patent Office 2,863,144
Patented Dec. 2, 1958

2,863,144

DEVICES FOR VARYING THE DIRECTION OF AN ELECTROMAGNETIC WAVE RADIATION

Stelian Herscovici and Jean Robieux, Paris, France, assignors to Compagnie Generale de Telegraphie Sans Fil, a corporation of France Application July 1, 1957, Serial No. 668,949

Claims priority, application France July 13, 1956

4 Claims. (Cl. 343—756)

The present invention relates to devices for varying the direction of ultra high frequency wave radiation.

In conventional radar systems, the devices which are generally used for this purpose include aerials comprising revolving elements, such as reflectors or horns. These elements are generally comparatively bulky and a rapid rotation thereof creates vibrations and requires powerful driving motors which, under certain conditions, may be a considerable disadvantage.

It is an object of the present invention to provide a system for varying the direction of an electromagnetic beam, having none of the above disadvantages.

A system according to the invention, which is for use with a rectilinearly polarized ultra-high frequency electromagnetic wave, comprises a first space where this wave is subjected to the gyromagnetic effect, means being provided to create in this space a uniform magnetic field directed along the propagation axis of the wave and to vary the intensity of this field periodically, whereby the direction of the polarization of the wave is caused to vary, and a second space where the wave is subjected to the field displacement effect in a direction normal to its polarization plane. To this effect, means is provided to create, in this space, a magnetic field having a direction which varies, but is constantly parallel to the direction of the electric field vector of the wave at the output of the first space.

According to a preferred embodiment of the invention, the first space is bounded by a first circular wave-guide, the axis of which is along the direction of the wave propagation. Arranged axially in this guide is a rod of a highly resistive ferro-magnetic material such as, e. g. of ferrite, and a magnetic field of periodically varying intensity is provided in the direction of the wave propagation. Under the action of the magnetic field, the electric field vector of the wave at the output of said guide will have rotated with respect to its position at the entry of the guide by an angle which is substantially proportional to the field intensity and varies periodically as a function of this field. This effect is sometimes referred to as the Faraday effect.

The second space is bounded by a second circular wave guide portion, the inner wall of which is also coated with a ferromagnetic material. Means are provided for creating within this guide a uniform magnetic field of fixed intensity and variable direction and for causing the intensity of the magnetic field in the first wave guide portion and the direction of the magnetic field in the second wave guide portion to vary in synchronism, in such a way that the latter field constantly remains parallel to the electric field vector of the wave at the output of the first guide.

Preferably, the second guide portion is extended by a horn of dielectric material in the shape of a truncated cone flaring in the direction of the wave propagation. In the terminal plane of this horn a radiation source is thus obtained. This source is shaped as a segment of the circle forming the base of this horn. The axis of this segment is normal to the electric field vector of the wave and all of its points radiate. At any instant, the chord limiting this segment is parallel to this vector.

This source is positioned in the focal plane of a reflector and the space in front of the reflector is scanned by the beam reflected by the reflector due to the fact that the exciter source rotates along the periphery of the base of the horn in synchronism with the variation rate of the magnetic field within the two guide portions.

The invention will be best understood from the following description which is given by way of example only and is to be taken in connection with the appended drawing wherein:

Figs. 1 and 2 are exploded diagrammatical views representing the underlying principle of the system according to the invention;

Figure 5:
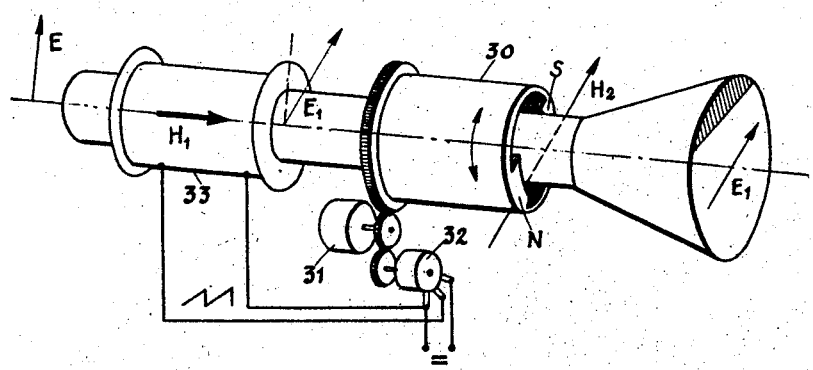
Figs. 4 and 5 represent, by way of example, diagrammatical views of two embodiments of the invention.

Referring to Fig. 1, a device 3 of any suitable known type, generates a rectilinearly polarized electromagnetic moment, along a straight line parallel to a fixed axis Oy extending along the plane of the wave. A circular waveguide portion 1 is placed at the output of device 3. In fact, there is no discontinuity between device 3 and wave guide portion 1, as well as between the latter and a wave guide portion 2 and a horn 6 to be described later. However, all these elements have been spaced in the drawing for the sake of clarity.

The axis of guide 1 extends in the direction of wave propagation Oz.

A ferrite rod 4 is positioned along the axis of guide 1 and is subjected to a magnetic field $H_1$, directed along axis Oz, and whose intensity periodically varies.

Circular guide 2 is coaxial with and has the same cross-section as guide 1. The inner wall of guide 2 is coated with a ferrite layer 5 and a uniform field $H_2$ is created within this guide. The lines of force of field $H_2$ have a direction which varies in the plane $xOy$ as will be described later. Wave guide 2 is terminated by a horn in the shape of a truncated cone of dielectric material, flared in the direction of wave propagation. The thickness of the horn decreases gradually in the same direction in the manner of a dielectric antenna.

The system operates as follows:

At the output of guide 1, on account of the gyromagnetic effect, while the polarization direction of the wave remains linear in the plane $xOy$, its electric field vector $E_1$ has rotated with respect to vector E, which is directed along Oy at the entry of guide 1, by an angle $\alpha$, substantially proportional to the field intensity $H_1$, i. e. such that $\alpha = kH_1$, where $k$ is a constant.

Means are provided to cause field $H_1$ to vary between two limits, corresponding respectively to an angle $\alpha_1 = 0°$ and to an angle $\alpha_2 = 2\pi$. The variation is controlled in such a manner that angle $\alpha$ increases from 0 to $2\pi$ during a time interval T, then reverses to zero during a negligible time. Consequently, $H_1$ varies in accordance with a sawtooth law.

As to the magnetic field $H_2$, it is made at any given instant parallel to the variable direction vector $E_1$. Consequently, at each instant, on account of the so-called "field displacement" effect, the energy, at the output of guide 2 is concentrated in a zone $f$ formed substantially as a segment, the chord of which is always parallel to vector $E_1$. Accordingly zone $f$ rotates about the axis of guide 2. In other words, the zone of maximum electric field intensity at the mouth of guide 2 is displaced in a direction perpendicular to the common direction of the magnetic field $H_2$ and of the electric field vector $E_1$. The truncated cone 6 is intended to increase the amplitude of this field displacement. At the opening of truncated cone 6 energy is concentrated in zone $F_1$, which has a shape similar to that of zone $f$. A paraboloid 8 (Fig. 2) serves as a reflector. The mouth of cone 6 is located in the focal plane of this reflector and its axis lies in the optical axis thereof. Zone $F_1$ occupies a variable position in said focal plane and rotates about the axis of the paraboloid at the rate of variation of field $H_1$. The beam emitted will then describe a cone.

Experience shows that satisfactory results are obtained when, on the one hand, field $H_1$ is sufficient to cause saturation of the ferrite rod 4, and when, on the other hand, the wave frequency is high with respect to the resonance frequency of the ferrite. Tests have been carried out for example, for a frequency of the order of 20,000 Mc./s. and for a field $H_1$ of the order of 100 to 200 gauss.

The length of guide 1 determines the factor $k$. This length must be sufficient to insure the matching of rod 4.

Figure 3:
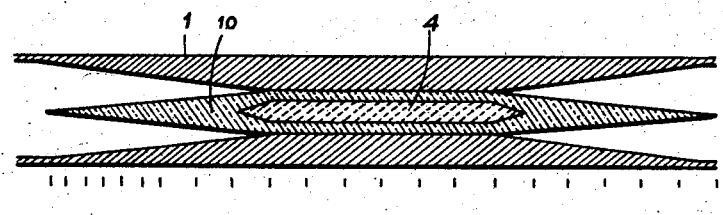
Fig. 3 is a detail of the system shown in Fig. 1.

Fig. 3 is a sectional view of an embodiment of guide 1.

The ferrite rod has a generally cylindrical shape, is terminated by two cones and is held in position in guide 1 by a similarly shaped piece of "Teflon" 10.

The ferrite having a high dielectric constant $\epsilon=10$, the portion guide 1 containing rod 4 has a somewhat smaller diameter, since the "Teflon," with $\epsilon=2$, increases the Faraday effect. The length of all these elements must be sufficient to ensure a correct matching. The overall length, may be equal to several times the wave length. For instance, with $\lambda=3$ cm., this length may vary from 5 to 6 $\lambda$, i. e. from 15 to 18 cm.

The length of guide portion 2, necessary for insuring the matching of the ferrite, is of the order of a wave length $\lambda$. The intensity of field $H_2$ is of the order of 500 to 1000 gauss.

Figure 4:
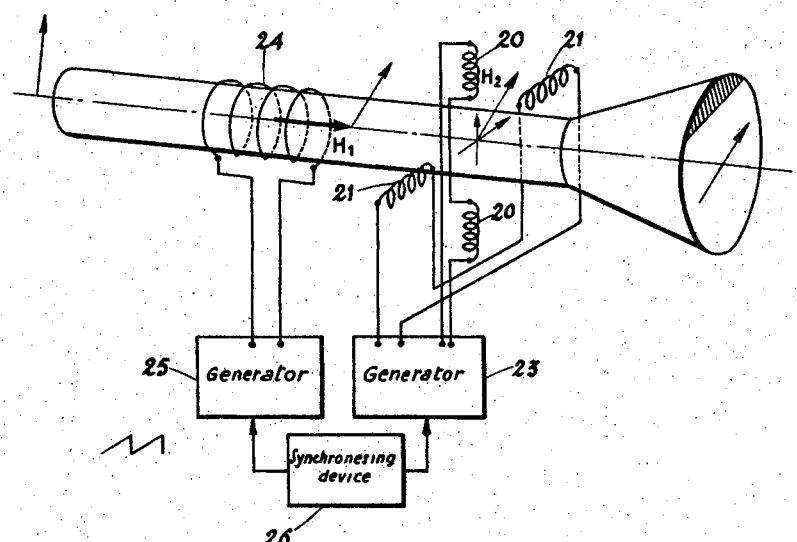

Figs. 4 and 5 show how the variation of the intensity of field $H_1$ and that of the direction of field $H_2$ can be timed with respect to each other. In Fig. 4, this is done by purely electronic means.

Two coils 20 and 21 are wound on guide portion 2 and form with the axis thereof a tri-angular trihedron. These windings are fed simultaneously by a generator 23 in such a manner that the respective currents flowing through these coils are phase shifted by an angle of $\pi/2$ with respect to each other.

A coil 24 is wound around guide portion 1 and is fed from a generator 25 supplying a saw-tooth voltage of the same frequency as the voltage supplied by generator 23. Both generators are synchronized by means of a device 26.

Consequently, field $H_2$ has a constant intensity and rotates with uniform speed about the axis of guides 1 and 2, while remaining perpendicular thereto. Field $H_1$ is always directed along this axis, but its intensity varies from a minimum to a maximum and vice-versa, according to a periodic saw-tooth law.

The cycle is the same as that of the variation of field $H_1$, thus achieving the synchronism mentioned hereinbefore, as well as the scanning of the space by a beam of high frequency waves, without use of any mobile parts.

In Fig. 5, a mechanical system is used. Field $H_2$ is created by a continuously revolving permanent magnet 30 driven by a motor 31. A potentiometer 32, also driven by motor 30, feeds a saw-tooth voltage to an electromagnet 33, which supplies the field $H_1$.

What we claim is:

1. A system for varying the propagation direction of a rectilinear polarization wave, comprising: a first wave guide portion having an input for receiving said wave; means for creating in said wave guide portion a first uniform magnetic field directed along the propagation direction of said wave therein; means for periodically varying the intensity of said field; a second wave guide portion in continuation of said first wave guide portion; means for creating in said second wave guide portion a magnetic field of constant intensity normal to the propagation direction of said wave and for varying the direction thereof in a plane perpendicular to said propagation direction with a period equal to the intensity variation period of said first field; and radiating means coupled to said second wave guide portion.

2. A system for varying the propagation direction of a rectilinear polarisation wave, comprising: a first wave guide portion having an input for receiving said wave; means for creating in said wave guide portion a first uniform magnetic field directed along the propagation direction of said wave therein, said means comprising a body of ferromagnetic resistive material extending coaxially with said guide portion; means for periodically varying the intensity of said field; a second wave guide portion in continuation of said first wave guide portion; means for creating in said second wave guide portion a magnetic field of constant intensity normal to the propagation direction of said wave, said means comprising a ferromagnetic internal coating in said second guide portion; means for varying the direction of said field in a plane perpendicular to said propagation direction with a period equal to the intensity variation period of said first field; and radiating means coupled to said second wave guide portion.

3. A system for varying the propagation direction of a rectilinear polarization wave, comprising: a first wave guide portion having an input for receiving said wave; means for creating in said wave guide portion a first uniform magnetic field directed along the propagation direction of said wave therein, said means comprising a body of ferromagnetic resistive material extending coaxially with said guide portion; means for perodically varying the intensity of said field; a second wave guide portion in continuation of said first wave guide portion; means for creating in said second wave guide portion a magnetic field of constant intensity normal to the propagation direction of said wave, said means comprising a ferromagnetic internal coating in said second guide portion; means for varying the direction of said field in a plane perpendicular to said propagation direction with a period equal to the intensity variation period of said first field; and a radiating horn coupled to said second wave guide portion, said horn having an internal resistive coating whose thickness decreases starting from said second wave guide portion.

4. A system for varying the propagation direction of a rectilinearly polarized wave, comprising: a first circular wave guide portion having an input for receiving said wave; means for creating in said wave guide portion a first uniform magnetic field directed along the propagation direction of said wave therein, said means comprising a body of resistive ferromagnetic material extending coaxially with said guide portion; means for periodically varying the intensity of said field; a second circular wave guide portion in continuation of said first wave guide portion; means for creating in said second wave guide portion a magnetic field of constant intensity normal to the propagation direction of said wave, said means comprising a ferromagnetic internal coating in said second guide portion and for varying the direction of said field in a plane perpendicular to said propagation direction with a period equal to the intensity variation period of said first field; and a radiating horn coupled to said second wave guide portion, said horn having an internal resistive coating whose thickness decreases starting from said second wave guide portion.

No references cited.